United States Patent [19]

Burger et al.

[11] Patent Number: 4,908,598
[45] Date of Patent: Mar. 13, 1990

[54] ROTARY POTENTIOMETER

[75] Inventors: Rita Burger, Grafing; Horst Pissulla, Ottobrunn, both of Fed. Rep. of Germany

[73] Assignee: Wilhelm Ruf KG, Munich, Fed. Rep. of Germany

[21] Appl. No.: 261,931

[22] Filed: Oct. 25, 1988

[30] Foreign Application Priority Data

Oct. 28, 1987 [DE] Fed. Rep. of Germany ....... 3736546

[51] Int. Cl.$^4$ ............................................. H01C 10/34
[52] U.S. Cl. ..................................... 338/174; 338/175
[58] Field of Search ................. 338/174, 175, 167, 162

[56] References Cited

U.S. PATENT DOCUMENTS

| 2,836,689 | 5/1958 | Mucher | 338/174 |
| 3,156,890 | 11/1964 | Oram | 338/174 |
| 4,812,803 | 3/1989 | Hochholzer | 338/175 |

FOREIGN PATENT DOCUMENTS

| 0124346 | 11/1984 | European Pat. Off. |
| 1840484 | 2/1961 | Fed. Rep. of Germany. |
| 3444229 | 11/1984 | Fed. Rep. of Germany. |
| 3447896 | 12/1984 | Fed. Rep. of Germany. |
| 3524308 | 7/1985 | Fed. Rep. of Germany. |
| 3624640 | 7/1986 | Fed. Rep. of Germany. |
| 2122033 | 1/1984 | United Kingdom. |

Primary Examiner—Teresa J. Walberg
Assistant Examiner—M. M. Lateef
Attorney, Agent, or Firm—Cushman, Darby & Cushman

[57] ABSTRACT

The cover of a casing of the potentiometer is formed with an opening which is adapted to be closed by another cover and through which the top surface of a resistor core is accessible. Trimming resistors are located on the top surface and are connected electrically to a resistor path applied on the bottom surface of the resistor core. This permits adjustments of the potentiometer to be made even when the assembly is completed.

6 Claims, 3 Drawing Sheets

ROTARY POTENTIOMETER

FIELD OF THE INVENTION

The instant invention relates to a rotary potentiometer, especially for use as a rotational position sensor detecting the rotational position of a shaft, comprising a casing, a resistor core fixed in the casing and having a resistor path applied to its bottom surface, a spring carrier supported for rotation in the casing, a slider spring fixed to the spring carrier and being in sliding electrical contact with the resistor path on the resistor core, and means for coupling the shaft to the spring carrier.

BACKGROUND OF THE INVENTION

Potentiometers of the kind described are known from the following publications: DE-OS 34 44 229, DE-OS 35 24 308, EP 0 124 346 A2, GB 21 22 033, and the earlier patent application P 36 24 364.9 which is not a prior publication.

A possibility of adjusting the potentiometer is described in DE-OS 34 44 229 and, for this purpose, an intermediate carrier is provided which is rotatable with respect to the spring carrier and to which the slider spring is riveted. All this permits is adjustment of the "zero position" of the potentiometer, while its resistance value cannot be trimmed.

In the case of GB 21 22 033 it is known to trim the resistor path by a fine cut which extends radially with respect to the curved resistance path and is located outside of the area swept over by the sliding contact of the slider spring.

That has the disadvantage that the electrical resistance value of the resistor path must be fixed prior to installing the resistor core in the potentiometer so that further factors of influence, like the contact pressure between the slider spring and the resistor path cannot be allowed for. In spite of possible adjustment, therefore, the tolerances of the electrical values of the potentiometer still are considerable.

SUMMARY OF THE INVENTION

It is, therefore, an object of the instant invention to improve the potentiometer of the kind specified initially such that very precise adjustment is possible of the electrical values of the potentiometer.

This object is met, in accordance with the invention, with a potentiometer of the generic kind in question in that the casing includes an opening at its side remote from the means for coupling the shaft to the spring carrier which opening is adapted to be closed by a cover and through which opening the top surface of the resistor core remote from the slider spring is accessible, and that the resistor path is connected electrically by through plating to at least one trimming resistor disposed on the top surface of the resistor core.

Advantageous modifications and further developments of the invention may be gathered from the dependent claims.

The basic concept of the invention is seen in forming the casing with an opening through which adjustments still can be effected when the potentiometer is in ready assembled state.

BRIEF DESCRIPTION OF THE DRAWING

The invention will be described further, by way of example, with reference to the accompanying drawings, in which.

DESCRIPTION OF THE PREFERRED EMBODIMENT

Figures 1, 1A:
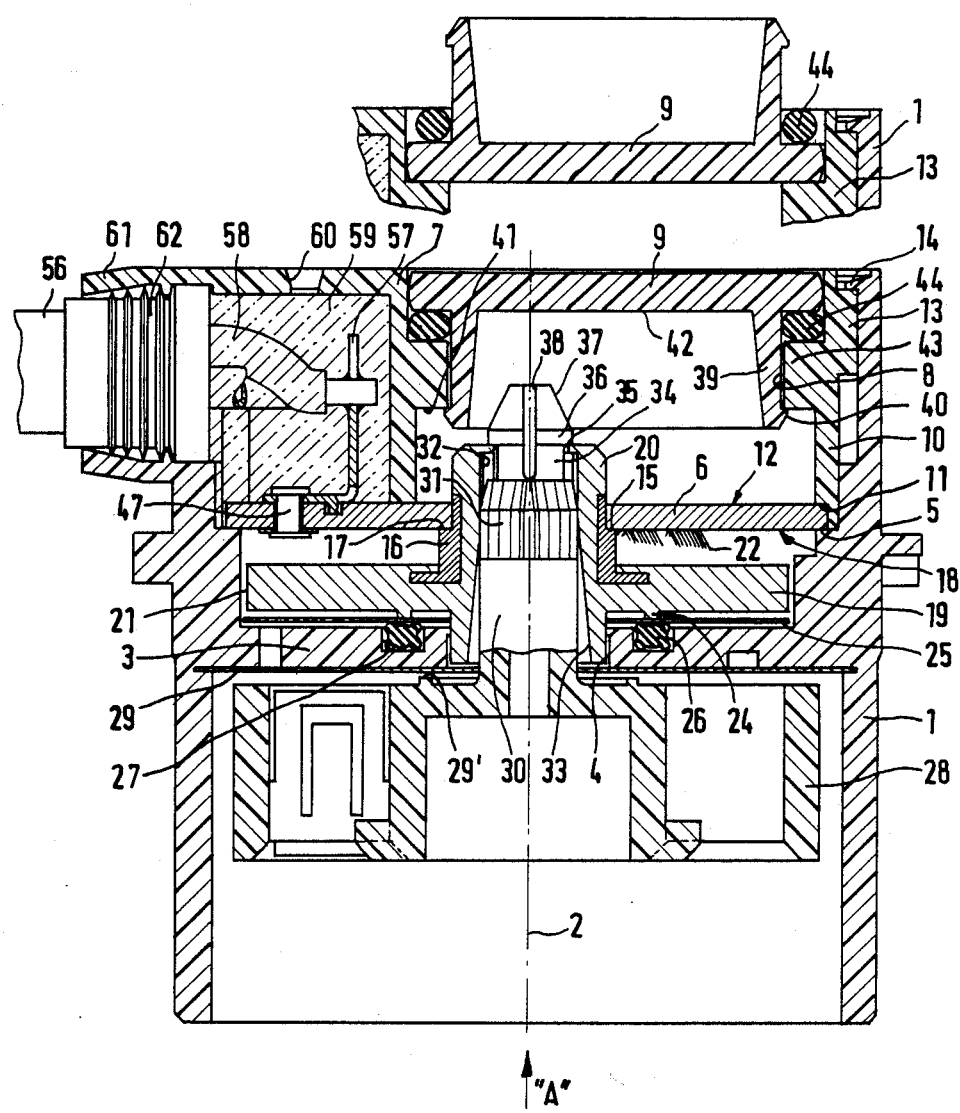
FIG. 1 is a longitudinal sectional elevation of the potentiometer.
FIG. 1a is a partial view of the top of FIG. 1 illustrating the condition of the cover as supplied.

The potentiometer has a substantially cylindrical casing 1 including, in its interior, a partition 3 which is perpendicular to the cylinder axis 2 and formed with a central opening 4 which is coaxial with the cylinder axis 2. There is a step 5 in the casing above the partition 3 and a resistor core 6 rests on that step. The casing 1 is closed by a cover 7 and another cover 9 adapted to be inserted in an opening 8 formed in the cover 7. The casing cover 7 includes a connecting piece 10 which extends into the interior of the casing and has an edge 11 at its end engaging the top surface 12 of the resistor core 6 so the resistor core is retained between the step 5 and the edge 11. In the range of its upper end the cover 7 includes a radially outwardly projecting collar 13 snapping behind a detention lug 14 formed at the casing and thus being held captive.

The resistor core 6 has an opening 15 which extends coaxially with the cylinder axis 2 and through which extends part of a bearing bush 16, an edge 17 of the bearing bush 16 resting on the bottom surface 18 of the resistor core 6.

The bearing bush 16 is fixed for rotation with a spring carrier 19, a hollow, cylindrical portion 20 passing through the bearing bush 16. One or more slider springs 22 are carried by a disc-shaped part 21 of the spring carrier so as to rotate together with the spring carrier, their contacts sliding on a resistor path 23 (FIG. 2) applied on the bottom surface 18 of the resistor core. The bottom surface of the disc-shaped part 21 is formed integrally with an axially projecting ring 24 supported on a metal disc 25 which in turn rests on the partition 3 with the intermission of a resilient sealing ring 26. In the embodiment shown, the sealing ring is embodied by a so-called "quad ring" which is held in an annular groove 27 formed in the partition 3. The cylindrical portion 20 of the spring carrier 19 extends at both sides of the disc-shaped part 21 and is centered at its lower end in the opening 4 of the partition 3. In this manner the spring carrier is rotatably supported practically without any clearance in the casing, the sealing ring 26 exerting so much pressure that the edge 17 abuts against the resistor core 6.

A rotary engaging member 28 which is located essentially below the partition 3 and, in addition, separated from the same by a metal ring 29 is provided for rotation of the spring carrier 19. The casing, made of plastics, is extruded partly around the metal ring 29 whereby the latter is firmly retained. The metal ring 29 serves the purpose of preventing frictional contact between the plastic material of the rotary engaging member 28, especially an integrally formed ring 29' thereof, and the plastic material of the partition 3 when the rotary engaging member is tilted with respect to the potentiometer axis. In that event plastic will rub on metal and that is more favorable, as regards frictional resistance and wear, than the rubbing of plastic on plastic. A shaft 30 of the rotary engaging member 28 protrudes into the central opening of the cylindrical portion 20 of the spring carrier and is connected for rotation with the spring carrier 19 by external teeth 31 meshing with internal teeth 32 in the cylindrical portion 20.

To balance alignment errors between an actuating shaft (not shown) of the potentiometer and the cylinder axis 2 of the potentiometer, the rotary engaging member 28 is supported to rock in the spring carrier such that the axis of the rotary engaging member 28 can adopt an acute angle with respect to the axis of rotation 2 of the spring carrier and the rotary engaging member can carry out wobbling motion. To accomplish that, the central opening in the cylindrical portion 20 has a conically tapering section 33 and the external teeth 31, too, taper conically in the direction of the free front end of the shaft 30.

The free end of the shaft 30 terminates in a cylindrical portion 34 which passes through a constriction 35 in the central through opening of the cylindrical portion 20 and is supported at the outside of the constriction 35 by a radially outwardly projecting collar 36. Starting from the collar 36 and in the direction of the free end, a chamfer 37 is provided as well as an axially extending slot 38 by virtue of which the shaft and the collar may be pushed through the constriction 35 and the rocking motion described is permitted by the elasticity provided by the slot 38.

Figure 2:
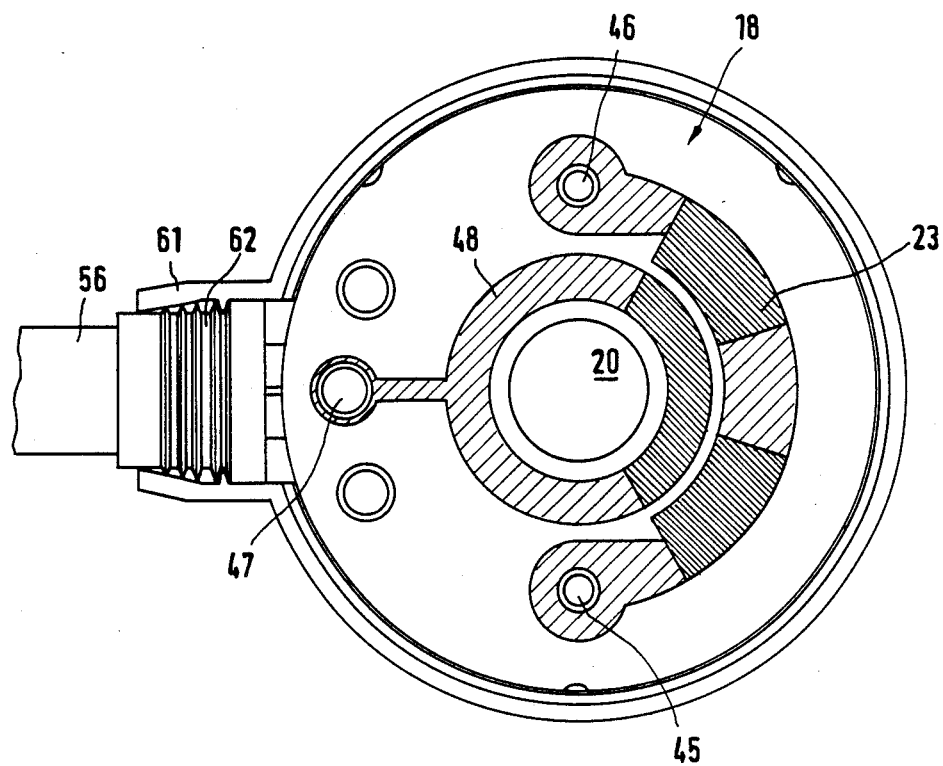
FIG. 2 is a top plan view of the "bottom surface" of the resistor core.
Figure 3:
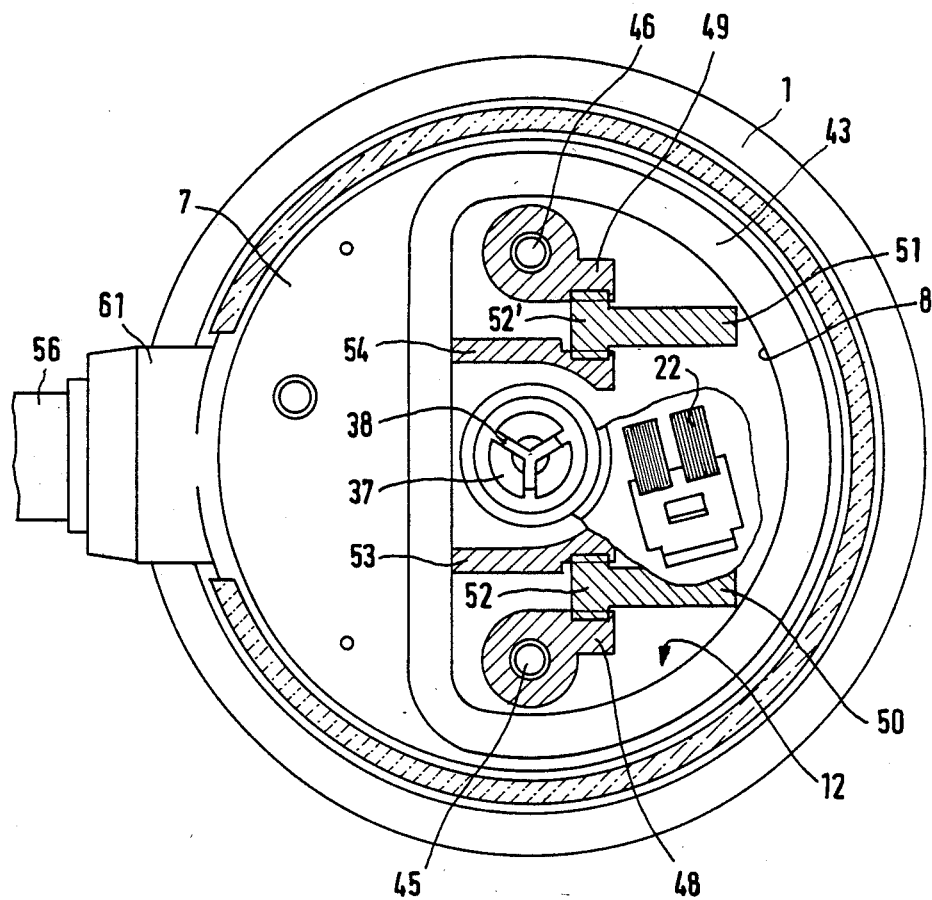
FIG. 3 is a top plan view of the "top surface" of the potentiometer.

The top surface 12 of the resistor core 6 is accessible from above through the opening 8 to permit adjustment of the resistance value of the potentiometer even when the assembly thereof is completed, as will be described in greater detail below with reference to FIGS. 2 and 3. It is only after this adjustment that the opening 8 is closed by the other cover 9. This cover 9 includes a portion 39 extending into the interior of the casing and a detention lug 40 formed at its free end for snap engagement behind an edge 41 which defines the opening 8. A sealing ring 44 which warrants tight sealing of the cover 9 is clamped between a planar portion 42 of this other cover 9 and a radially inwardly projecting collar 43 defining the opening 8.

The partial view shown in FIG. 1 illustrates the condition of the cover as supplied. Here the cover has not yet been snapped into engagement but instead is placed on top in inverted position because, once it is caught, it practically cannot be removed without destruction.

The resistor path 23 applied on the bottom surface 18 of the resistor core 6 is accessible electrically from the top surface 12 by through platings 45,46 and another through plating 47 for a center tap 48, the platings being fixed by riveting. Those through platings 45 and 46 which are connected to the ends of the resistor path 23 are arranged such that they are located in the area of the opening 8.

The through platings 45 and 46 each are connected electrically to a conductor path 48 and 49, respectively, to each of which a respective end of a bar of a trimming resistor 50 and 51, respectively, is linked. The trimming resistors 50, 51, for instance, are printed of carbonaceous resistive varnish on the top surface 12 of the resistor core 6. Their configuration is approximately that of a T, with that bar 52, 52' which has two free ends (being the horizontal bar of the letter "T") presenting the input or output, respectively, of the corresponding trimming resistor 50 or 51. The other bar end of the trimming resistors 50 and 51 each is connected electrically to a conductor path 53 and 54, respectively, printed on the resistor core and made, for instance, of silver. As far as the production is concerned, first the conductor paths 48, 49, 53, and 54 are printed and then the trimming resistors 50 and 51.

The trimming resistors 50 and 51 are connected in series between the conductor paths 53 and 54, respectively, and the resistor path 23 applied on the bottom surface 18 of the resistor core 6. Varying the trimming resistors 50 and 51 therefore causes variation of the total resistance of the potentiometer since the total resistance of the potentiometer is measured between the two conductor paths 53 and 54. For variation, the trimming resistors 50 and 51 may be formed with a slot each extending approximately parallel to the longitudinal axis of that leg which is perpendicular to the bar 52 and 52'. The deeper this slot is cut into the trimming resistor, starting from bar 52 or 52', the greater the electrical resistance value becomes.

As shown for the center tap in FIG. 1, the conductor paths 53 and 54 are connected electrically to a cable 56, each by means of a solder tag 57 to which a wire 58 of the cable 56 is soldered. The space in which the solder tags 57 are located is filled with a casting compound 59 which may be introduced through an aperture 60. A connecting piece 61 defined by the casing 1 and the cover 7 and through which the cable 56 passes may be sealed in addition by a sealing sleeve 62.

Any technical detail shown in the claims, specification, or drawing may be essential of the invention, either independently or in any desired combination.

We claim:

1. A rotary potentiometer comprising:
    a casing having an opening adapted to be closed by a cover;
    a resistor core having a top surface facing the opening and a bottom surface fixed in the casing, the resistor core having a resistor path applied to its bottom surface, inaccessible from the opening;
    a spring carrier supported for rotation in the casing;
    a slider spring fixed to the spring carrier and being in sliding electrical contact with the resistor path on the resistor core;
    means, positioned on a side of the casing remote from the opening, for coupling a shaft to the spring carrier; and
    the casing includes an opening at its side remote from the means for coupling the shaft to the spring carrier which opening is adapted to be closed by a cover and through which
    at least one trimming resistor, disposed on the top surface of the resistor core and accessible through the opening when the cover is removed, electrically connected to the resistor path by through plating through the resistor core.

2. The potentiometer as claimed in claim 1, wherein the trimming resistor is imprinted on the top surface of the resistor core.

3. The potentiometer as claimed in claim 2, wherein the trimming resistor is T-shaped, the free ends of the horizontal bar constituting the trimming resistor input and output, respectively.

4. The potentiometer as claimed in claim 3, wherein the vertical bar which has only one free end is formed with a slot which extends substantially parallel to the longitudinal axis thereof to enable the adjustment.

5. The potentiometer as claimed in one of claims 1 to 4, wherein the cover is adapted to enter into snap engagement in the casing.

6. The potentiometer as claimed in claim 5, wherein a sealing ring is arranged between the cover and the casing.

* * * * *